(12) United States Patent
Loldj et al.

(10) Patent No.: US 9,075,408 B2
(45) Date of Patent: Jul. 7, 2015

(54) ENERGY SAVINGS AND GLOBAL GAS EMISSIONS MONITORING AND DISPLAY

(75) Inventors: Youssef A. Loldj, Sunnyvale, CA (US); Maxime Cayer, Chandler, AZ (US); Jay J. Jung, Sunnyvale, CA (US); Shaun Crawford, San Ramon, CA (US); Dana Tribula, Menlo Park, CA (US); Daniel O. Clark, Pleasanton, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 683 days.

(21) Appl. No.: 12/945,869

(22) Filed: Nov. 14, 2010

(65) Prior Publication Data

US 2011/0144791 A1 Jun. 16, 2011

Related U.S. Application Data

(60) Provisional application No. 61/261,725, filed on Nov. 16, 2009.

(51) Int. Cl.
*G06F 19/00* (2011.01)
*G05B 19/042* (2006.01)
*G05B 19/045* (2006.01)

(52) U.S. Cl.
CPC ............ *G05B 19/042* (2013.01); *G05B 19/045* (2013.01); *G05B 2219/23316* (2013.01); *G05B 2219/2612* (2013.01)

(58) Field of Classification Search
CPC ............... G06Q 30/0283; G06Q 50/06; H01L 21/67242; H01L 21/67253; H01L 2121/67276
USPC .......... 702/179; 700/108, 282, 130, 295, 121, 700/306; 705/1, 7, 63; 204/602, 405, 416; 73/866.5, 865.8
See application file for complete search history.

(56) References Cited

U.S. PATENT DOCUMENTS

| | | | |
|---|---|---|---|
| 5,297,992 A * | 3/1994 | Bailey et al. ................... | 454/339 |
| 6,397,883 B1 * | 6/2002 | Huntley et al. ................ | 137/382 |
| 6,449,530 B1 * | 9/2002 | Yamada et al. ................ | 700/214 |
| 7,153,690 B2 * | 12/2006 | Stevens et al. ................. | 436/51 |
| 7,212,977 B2 * | 5/2007 | Tsuji et al. ..................... | 705/63 |
| 7,214,537 B2 * | 5/2007 | Stevens et al. ................. | 436/42 |

(Continued)

OTHER PUBLICATIONS

International Search Report and Written Opinion mailed Jun. 23, 2011 for PCT Application No. PT/US2010/056825.

*Primary Examiner* — Carol S Tsai
(74) *Attorney, Agent, or Firm* — Moser Taboada; Alan Taboada

(57) ABSTRACT

Methods and apparatus for enhanced control, monitoring and recording of incoming chemical and power use, and emissions of electronic device manufacturing systems are provided. In some embodiments, integrated sub-fab system systems may monitor the energy usage of the sub-fab equipment. The tool can enter many different depths of energy savings modes such as idle (shallow energy savings where production equipment can recover to normal production with no quality or throughput impact in seconds), sleep (deeper energy savings where production equipment can recover in minutes), or hibernate (where production equipment may require hours to recover not to have impact on quality, or throughput) for the system. In some embodiments, the system may monitor and display all gas emissions in a sub-fab as well as the Semi S23 method reporting of $CO_2$ equivalent emission. The system may monitor effluent process gases and energy use from the process tool and sub-fab equipment.

16 Claims, 7 Drawing Sheets

(56) References Cited

U.S. PATENT DOCUMENTS

| | | | |
|---|---|---|---|
| 7,376,490 B2 * | 5/2008 | Ueno et al. | 700/291 |
| 7,684,903 B2 * | 3/2010 | Tomine | 700/306 |
| 7,742,830 B1 | 6/2010 | Botes | |
| 7,760,325 B2 * | 7/2010 | Okada | 355/30 |
| 7,826,916 B2 * | 11/2010 | Tomine | 700/121 |
| 8,249,472 B2 * | 8/2012 | Motoyama | 399/37 |
| 8,264,271 B2 * | 9/2012 | Nishimura | 327/392 |
| 8,266,076 B2 * | 9/2012 | Lopez et al. | 705/412 |
| 8,718,825 B2 * | 5/2014 | George | 700/276 |
| 2002/0178047 A1 | 11/2002 | Or et al. | |
| 2003/0121799 A1 * | 7/2003 | Stevens et al. | 205/775 |
| 2004/0065547 A1 * | 4/2004 | Stevens et al. | 204/405 |
| 2004/0102872 A1 | 5/2004 | Schick et al. | |
| 2004/0220702 A1 | 11/2004 | Matsubara et al. | |
| 2005/0185427 A1 * | 8/2005 | Lv et al. | 363/21.1 |
| 2006/0172427 A1 * | 8/2006 | Germouni et al. | 436/55 |
| 2006/0211129 A1 * | 9/2006 | Stevens et al. | 436/173 |
| 2007/0106671 A1 * | 5/2007 | Uchida et al. | 707/10 |
| 2007/0255461 A1 | 11/2007 | Brickfield et al. | |
| 2008/0167772 A1 * | 7/2008 | Du et al. | 701/33 |
| 2009/0011376 A1 * | 1/2009 | Okada | 430/325 |
| 2009/0107212 A1 * | 4/2009 | Becker | 73/23.2 |
| 2009/0187445 A1 * | 7/2009 | Barclay et al. | 705/7 |
| 2009/0195349 A1 * | 8/2009 | Frader-Thompson et al. | 340/3.1 |
| 2009/0228406 A1 * | 9/2009 | Lopez et al. | 705/412 |
| 2010/0325465 A1 * | 12/2010 | Kazama et al. | 713/340 |
| 2011/0138202 A1 * | 6/2011 | Inoue et al. | 713/310 |

* cited by examiner

FIG. 3A

ENERGY SAVINGS AND GLOBAL GAS EMISSIONS MONITORING AND DISPLAY

FIELD

The present invention is related to the manufacture of electronic devices, and more specifically, to systems and methods for increasing the efficiency of electronic device manufacturing systems.

BACKGROUND

Sub-fab equipment do not have monitoring data for energy consumption and/or energy savings. The inventors believe that legislation in the US and around the world may eventually require users to report baseline $CO_2$ and global warming gas (GWG) emissions by tool as well as across the factory. The inventors further believe that owners and/or operators of fabs may wish to collect such data for internal use as well.

For example, the current industrial paradigm for accurately measuring real time factory chemical emissions at the tool level is very expensive, takes a long time, and requires a large number of equipment sets and technical specialists. Statistical models that predict generic factory emissions for a defined group of factory types or production categories, as proposed by industry consortia, have been shown to deviate from actual factory emissions by a large factor, such as 20%-400%. The inventors believe that carbon trading value or environmental damage assessments/fines that may be imposed by legislation would make it problematic to make such assessments based on such high uncertainty.

The inventors further believe that full factory emissions reporting on a per tool or full factory basis would require data that is collected by certified methods and certified skilled workers. This characterization would be very expensive and technically difficult. Each tool emissions values change with adjustments in recipe and support equipment parameters. Production facilities, and foundries typically must make process and support equipment adjustments in order to ensure that a factory certified in the past may continue to control emissions in the future. In order to accurately measure the emissions of a particular set of equipment, appropriate effluent sample ports must be made available to measure the output after the process tool and abatement. Factory stack locations must also have appropriate sample ports. The analytical tool sets specified, and industry approved protocols and methods are very expensive to execute. Emissions characterization is very time consuming and must be done over multiple process cycles to assure statistically significant data that are accurately representative of factory emissions. Analysis of data for accuracy and repeatability requires expert and/or certified chemists to collect and interpret data. The metrology tool sets require documentation, certification, and calibration for each data set. Third party companies who make such measurements require a month or more to schedule and a month or more to collect, interpret data, and write a report. Scheduling several days of access time (per tool) to collect emissions measurements under production conditions is very difficult due to concerns of production losses and factory upset.

Various global locations, regions, and countries have differing regulatory emissions requirements. Many include daily, quarterly and/or yearly accumulative reports supported by credible metrics. Local water treatment plants have differing minimum incoming water requirements that users must certify their effluent to meet.

SUMMARY

Methods and apparatus for enhanced control, monitoring and recording of incoming chemical and power use, and emissions of electronic device manufacturing systems are provided herein. In some embodiments, integrated sub-fab system systems in accordance with the present invention may monitor the energy usage of the sub-fab equipment. The tool can enter many different depths of energy savings modes such as idle (shallow energy savings where production equipment can recover to normal production with no quality or throughput impact in seconds), sleep (deeper energy savings where production equipment can recover in minutes), or hibernate (very deep mode of energy savings where production equipment may require hours to recover not to have impact on quality, or throughput) for the system. In some embodiments, the system may monitor and display all gas emissions in a sub-fab as well as the Semi S23 method reporting of $CO_2$ equivalent emission for power and energy consumption. The system may monitor all effluent process gases and energy use from the process tool and sub-fab equipment. Based on known Destruction Removal Efficiencies, the system can calculate the actual gas and $CO_2$ equivalent emission of the system, tabulating them over time and reporting them as requested. The system may also monitor all of the internal energy usage and provides the equivalent $CO_2$ emission for that as well.

In some embodiments, an apparatus for providing energy usage statistics for a semiconductor manufacturing tool may include a controller that determines a set of energy usage measurements for one or more manufacturing system sub-fabs; and reports the set of energy usage measurements.

In some embodiments, a system for providing energy usage statistics for a semiconductor manufacturing tool may include one or more controllers that determine a set of energy usage measurements for one or more manufacturing system sub-fabs; and report the set of energy usage measurements to a remote server; wherein the remote server aggregates the energy usage measurements from the one or more controllers and provide an aggregated energy usage report.

In some embodiments, a method for providing energy usage statistics for a semiconductor manufacturing tool may include determining a set of energy usage measurements for one or more manufacturing system sub-fabs coupled to a controller; and reporting the energy usage measurements.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

FIGS. 3A-C depict exemplary energy savings meters of an integrated sub-fab system in accordance with some embodiments of the present invention.

Figure 1:
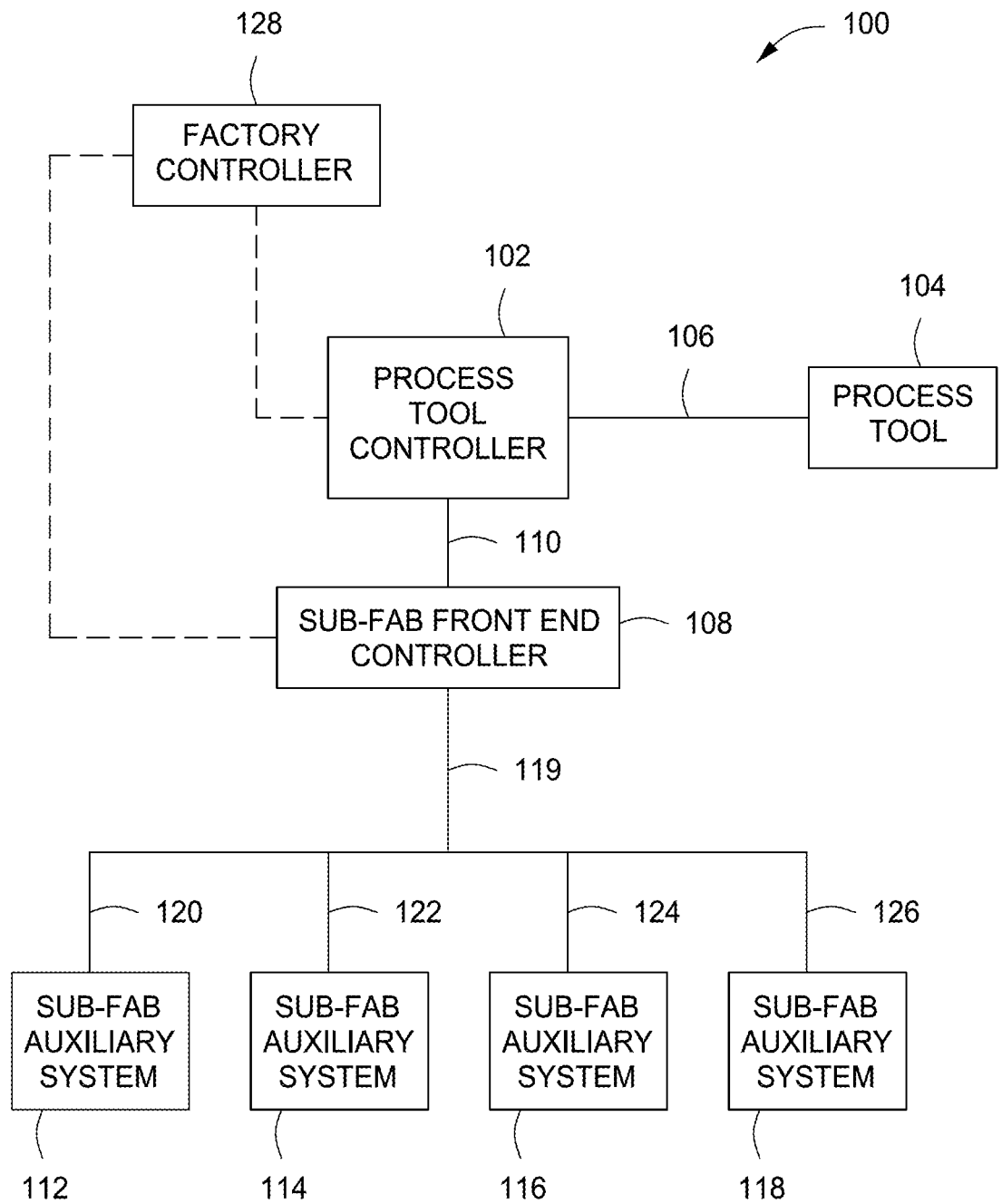
FIG. 1 is a schematic depiction of a system for operating an electronic device manufacturing system sub-fab in accordance with some embodiments of the present invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention provide improved control systems for a sub-fab that may advantageously tabulate and report energy usage and savings of electronic device manufacturing systems having an integrated sub-fab control system. In some embodiments, integrated sub-fab system systems in accordance with the present invention may monitor the energy usage of the sub-fab equipment and when the tool enters an idle mode, totalize the energy savings for the system. In some embodiments, the system may monitor and display all gas emissions in a sub-fab as well as the $CO_2$ equivalent emission. The system may also monitor all of the internal energy usage and provides the equivalent $CO_2$ emission for that as well.

The sub-fab may contain such auxiliary devices as abatement tools, AC power distributors, primary vacuum pumps, spare vacuum pumps, water pumps, chillers, heat exchangers, process cooling water supplies and delivery systems, electrical power supplies and delivery systems, inert gas dumps, valves, device controllers, clean dry air supplies and delivery systems, ambient air supplies and delivery systems, inert gas supplies and delivery systems, fuel supplies and delivery systems, touch screens, process logic controllers, reagent supplies and delivery systems, etc. The use of this equipment causes sub-fabs to commonly utilize large amounts of energy and other resources, require more maintenance, and produce large amounts of waste heat, which has a detrimental environmental effect. All of this may be very expensive for a fab operator.

Sub-fab equipment has generally been designed to operate and has been operated continuously in high capacity modes ("high energy mode") to reduce the likelihood that the sub-fab will encounter a worst-case effluent load from the process chamber which it is not able to fully abate. Chillers and pumps may operate at maximum power consumption to assure adequate flow and cooling capacity as required by process chambers. Exhaust line temperature control may be operating at maximum energy consumption to assure maximum capacity for heat addition or removal is available even if process and inert gas flows and chamber pressure requirements could range from minimum to maximum. Such sub-fab equipment design may be effective, but inefficient, because of high power consumption and poor power factor of some or many of the individual components of the sub-fab or process tools to which they are attached.

An example of an electronic device manufacturing system having an integrated sub-fab suitable for modification and use as described herein is provided in commonly owned U.S. patent application Ser. No. 12/365,894, filed Feb. 4, 2009 by Daniel O. Clark, et al., and entitled, "Methods and Apparatus for Operating an Electronic Device Manufacturing System," and which is herein incorporated by reference in its entirety.

FIG. 1 is a schematic depiction of a system 100 for operating an electronic device manufacturing system sub-fab in accordance with some embodiments of the present invention. System 100 may include a process tool controller 102 which may be linked to a process tool 104 through communication link 106. Process tool controller 102 may be any microcomputer, microprocessor, logic circuit, a combination of hardware and software, or the like, suitable to control the operation of the process tool 104. For example, process tool controller 102 may be a PC, server tower, single board computer, and/or a compact PCI, etc. Process tool 104 may be any electronic device manufacturing process tool which requires effluent abatement and/or other resources from a sub-fab support system. Communication link 104 (and any other communication link described herein) may be hardwired or wireless and may use any suitable communication protocol such as, SECS/GEM, HSMS, OPC, and/or Device-Net.

The process tool controller 102 may be linked to the sub-fab front end controller 108 by means of communication link 110. The sub-fab front end controller 108 may be any microcomputer, microprocessor, logic circuit, a combination of hardware and software, or the like, suitable to control the sub-fab auxiliary systems/device 104. For example, sub-fab front end controller 108 may be a PC, server tower, single board computer, and/or a compact PCI, etc.

The sub-fab front end controller 108 may in turn be linked to sub-fab auxiliary systems/devices 112, 114, 116 and 118 through communication links 120, 122, 124 and 126, respectively. The Sub-fab auxiliary systems/devices may each have a controller (not shown), such as a PLC. Alternatively, the sub-fab front end controller 108 may perform the functionality of a lower-level PLC controller for any or all of the sub-fab auxiliary systems/devices. Although four sub-fab auxiliary systems/devices are shown, it should be noted that more or fewer than four sub-fab auxiliary systems/devices may be linked to the sub-fab front end controller 108. Sub-fab auxiliary systems/devices may include abatement tools, ac power distributors, primary vacuum pumps, spare vacuum pumps, water pumps, chillers, heat exchangers, process cooling water supplies and delivery systems, water recovery and/or treatment systems, electrical power supplies and delivery systems, inert gas dumps, valves, device controllers, clean dry air supplies and delivery systems, ambient air supplies and delivery systems, inert gas supplies and delivery systems, fuel supplies and delivery systems, touch screens, process logic controllers, reagent supplies and delivery systems, etc.

In operation, process tool controller 102 may control process tool 104 by operating one or more of robots, doors, pumps, valves, plasma generators, power supplies, etc. As described above, process tool controller 102 may be constantly aware regarding the state of, and resource requirements of, each chamber in the process tool 104 and of the process tool 104 as a whole. Process tool controller 102 may have access to a database (not shown) which the process tool controller 102 may use to calculate the resource requirements of the chambers (not shown) and the process tool 104 as a whole. In addition, the process tool controller 102 may be linked to instruments in the sub-fab (not shown) from which the process tool controller 102 may calculate the resource requirements of sub-fab systems and/or devices. Alternatively the sub-fab front end controller 108 may be linked to the instruments in the sub-fab (not shown), calculate the resource requirements of the sub-fab systems and/or devices and provide information regarding the resource requirements of the sub-fab systems and/or devices to the process tool controller 102.

The process tool controller 102 may communicate such resource requirements to the sub-fab front end controller 108 which may in turn control one or more sub-fab auxiliary systems/devices 112, 114, 116 and 118 by operating pumps, switches valves, power supplies, and/or other hardware through communication links 119, 120, 122, 124 and 126. In this fashion, the amount of energy which may be required to operate the sub-fab equipment may be reduced to a level which provides sufficient resources to safely and efficiently operate the process tool 104 and to fully abate the effluent which flows from the process tool 104. By sufficient resources is meant a minimum amount of resources to avoid negatively impacting the process tool 104 and/or the throughput and/or efficiency of the process tool 104, plus any additional amount of resources above the minimum required resources to provide a desired margin of safety and/or error. Management of the sub-fab equipment may include operating one or more elements of the sub-fab equipment, such as pumps, chillers, line heaters, and the like, in a low power state to save on energy and emissions requirements. Such a low power state may be entered when the particular elements of sub-fab equipment are not in use, or when the sub-fab equipment is capable of operating at a lower power state without affecting system performance. For example, at different steps of the fabrication process, various elements of sub-fab equipment may not be necessary and so may be placed in a sleep, idle, hibernation, or off state, dependent upon how soon the elements are likely to be needed. Examples of power saving low power states include an idle state, a sleep state, and a hibernate state. The primary differences between the three power saving states are duration and energy consumption. Deeper levels of idle mode energy savings, such as sleep or hibernate, require longer periods of time to recover from energy savings modes to achieve full production without affecting the quality or yield of the fabrication process. Recovery of the process chambers and associated sub-fab equipment to best known method (BKM) temperatures and pressures can take seconds, minutes, or hours depending on the degree of deviation from BKM chamber conditions associated with the power saving state of the sub-fab equipment and process chamber. An idle state typically lasts for seconds, a sleep state typically lasts for minutes, and a hibernate state typically lasts for hours. Energy savings operating conditions for these conditions are predetermined by the process tool controller 102 or sub-fab front end controller 108. These energy savings operating conditions are platform, chamber, and process specific.

The process tool 102 and associated manufacturing system sub-fabs may have a variety of different power configurations based upon operating needs. For example, power configurations may exist where the process tool is in an "off" state while various air flow and abatement systems are operating at full capacity to perform shut down operations after completing a fabrication operation. For the purposes of this application, the term "low power configuration" refers to any state where one or more elements of the process tool 102 and/or manufacturing system sub-fabs are instructed by one or more controllers to operate in a power-savings mode, such as different levels of energy consumption during specific process recipe steps or non-production idle modes of operation such as idle, sleep, and hibernate states described above, or an off state.

Before entering a low power configuration, the process tool controller 102 or sub-fab controller 108 verifies that the process tool 104 is capable of operating in a low power configuration. Prior to engaging the low power idle, sleep, or hibernate modes of energy savings, the process tool controller 102 or sub-fab controller 108 verifies that there is no wafer in the process chamber, that no process chamber of support equipment will be needed in the immediate future. Specific information (such as status variable ID (SVID) and collected event ID (CEID)) from the process tool such as gas names and flows, chamber status, recipe and lot start/stop, and the like will be monitored to ensure the system can be brought to a stable ready state when ending the low power state. The process tool controller 102 or sub-fab controller 108 also verifies that entering or exiting a low power configuration will not result in any adverse impact on the first wafer used the next time the chamber activates.

The process tool controller 102 or sub-fab controller 108 may cause the sub-fab equipment to enter a low power configuration in a variety of ways. In some embodiments, entry into a low power configuration is triggered by manual request, such as by a user selecting a low power option using an interface on the process tool controller 102. In some embodiments, the low power configuration is triggered based upon a time out trigger associated with the process tool (e.g. the process tool automatically enters the low power configuration after a predetermined period of inactivity, subject to the requirements of entering the low power configuration enumerated above). In some embodiments, a factory controller 128 sends a command instructing the sub-fab equipment to enter the low power configuration.

Figure 2:
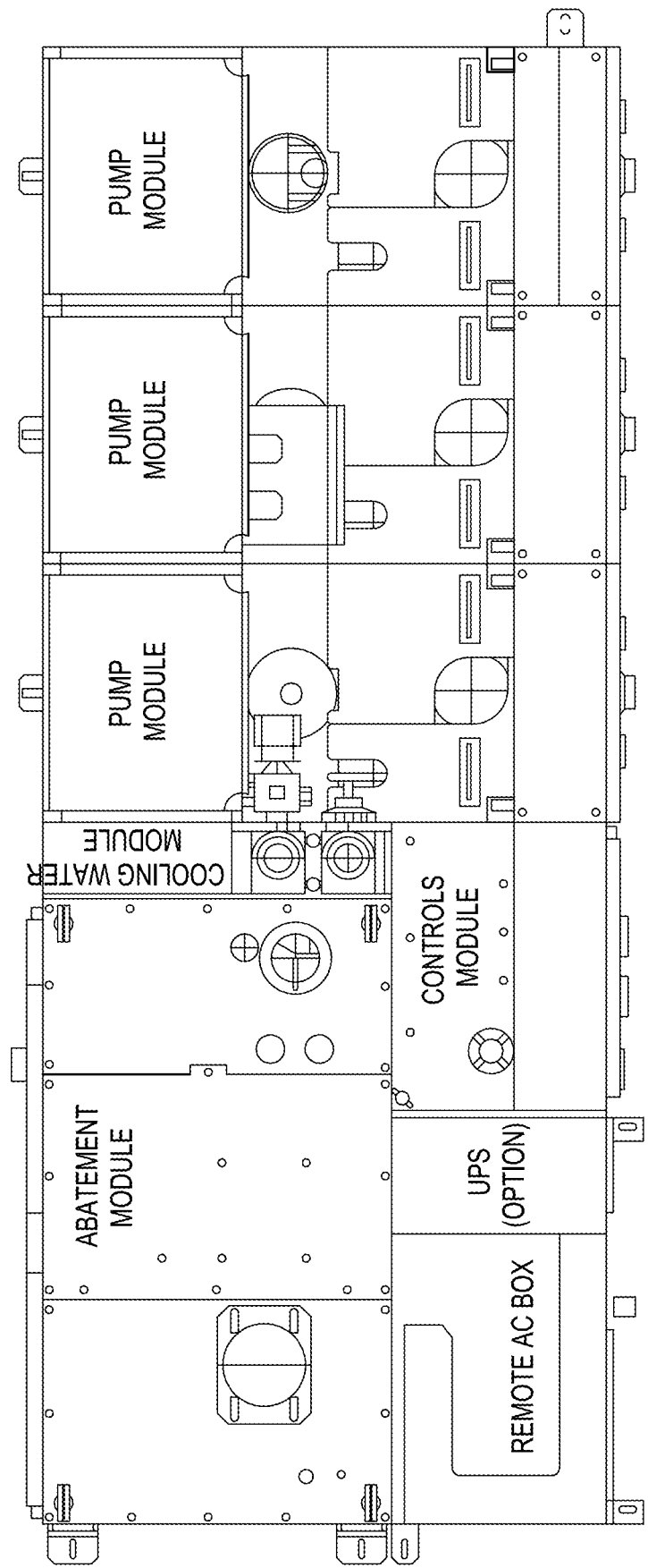
FIG. 2 is a schematic depiction of an integrated sub-fab system for use in an electronic device manufacturing system in accordance with some embodiments of the present invention.

In some embodiments, the integrated sub-fab system communicates with an "open platform" equipment set to provide a lower carbon footprint operation of a process tool for a production application. For example, FIG. 2 depicts one non-limiting configuration of such a system showing a compact, integrated system having an abatement module, a cooling water module, pump modules, a remote AC power box, an uninterruptable power supply (UPS), and a controls module. The open platform advantageously accommodates customer equipment preferences and achieves lowest environmental footprint, best technical performance, highest throughput, and lowest cost of ownership. For example, such a configurable sub-fab system may include one or more abatement units, vacuum pumps, chillers, interconnections for various systems, and utilities distribution in a compact unit synchronized with one or more process tools via an integrated sub-fab controller (such as sub-fab front end controller 108, discussed above). In addition, the energy control system as described herein may also be utilized in existing or new facilities with dispersed components (e.g., not compactly configured as in FIG. 2).

The integrated sub-fab can utilize signals and control capability to manage, for example: pumps to control process chamber exhaust and pressure, chillers or heaters to control chamber or component temperatures optimal for the process (tool specific best known methods (BKMs)), and the abatement tool most appropriate for the process tool emission requirements (e.g., process recipe-dependent energy savings based upon setpoint control for particular recipe). Optionally, local A/C, process cooling water, air handlers, chemical delivery systems, purge flows, power conditioning, cabinet exhaust flow, local thermal cross exchange, etc. can be managed by the integrated sub-fab controller.

Integrated sub-fab system systems in accordance with the present invention may monitor the energy usage of the sub-fab equipment and when the tool enters an idle mode, or any other lower energy production operating mode, totalize the energy savings for the system. In some embodiments, the system may monitor and display all gas emissions in a sub-fab as well as the $CO_2$ equivalent GWG emission or energy consumption. The system may monitor all effluent process gases and energy use from the process tool and sub-fab equipment. Based on known DRE, the system can calculate the emission of the system, tabulating them over time and reporting them as requested. The system may also monitor all of the internal energy usage and provides the equivalent $CO_2$ emission for that as well.

The system might include real time emissions sensors to monitor and validate the $CO_2$ exhaust emission as well as being able to report emissions based on operational tabulation for processes that emissions and energy consumption have been previously characterized.

In some embodiments, the system 100 further comprises a factory controller 128. The factory controller 128 is optionally connected to the sub-fab front end controller 108 and/or the process tool controller 102. The factory controller optionally communicates by HSMS (E37), SECS II/GEM (E5/E30) to the sub-fab front end controller. The factory controller 108 sends and receives energy savings state information to and from the process tool controller 102 and the sub-fab front end controller 108. Deeper energy savings modes typically require additional recovery time for the process tool 104 and sub-fab systems 112 through 118 when entering a full production state. To assure no impacts to first substrate quality, throughput, or yield, the factory controller 128 manages factory scheduling operations to ensure optimal performance and energy savings. When the sub-fab equipment will not be needed for an extended period of time, the factory controller 128 directs the equipment to enter deeper modes of energy savings such as "sleep" or "hibernate" modes of operation. When the sub-fab equipment is needed, the factory controller 128 begins the process of recovering the sub-fab equipment from deeper energy saving modes of operation prior to actual use, such that there is no impact to the fabrication process.

Embodiments of the present invention may thus provide one or more of: carbon foot print data collector and report; carbon foot print calculated based on total effluent gases and DRE; carbon footprint calculated based on utilities usage (Electrical, water etc.); time mapped carbon footprint based on recipe step; carbon footprint report based on real time emissions measured of effluent from each step in the recipe); carbon footprint report based on qualified emissions measurement and calculated for effluent from each step in the recipe as previously measured; and reports for each tool or across tool sets.

For example, in some embodiments, an integrated sub-fab system monitors and displays all gas emissions from the sub-fab tool set as well as the $CO_2$ Equivalent Emission. Energy savings are calculated and reported with Semi S23 complaint methods. In some embodiments, energy savings are calculated by measuring a power consumption of a process tool utilizing a low power configuration as described above, and comparing the power utilization during the lower power configuration to a power consumption of the process tool without the benefit of a low power configuration option. The process of measuring the energy savings of the process tool is discussed further with respect to FIG. 5. The system monitors all effluent process gases from the process tool and based on DRE measurements, calculates the carbon or $CO_2$ emission equivalent of the system.

In some embodiments, real time and or accumulative equivalent $CO_2$ emission report may be provided for the each tool set. Emissions from process chambers during deposition, clean, idle mode, and stand-by vary significantly. Factory tool utilization can vary from tool to tool and can be as low as 20% to as high as 95%. The data collection and analysis provided by the current invention accurately adjusts cumulative and instantaneous time mapped emissions and energy consumption reports for process mode and uptime. Utilities consumption is monitored by the integrated sub-fab system so they are also included in the $_{CO2}$ equivalent report Embodiments of the present invention, using real time emissions sensors to confirm tools are operating to specified performance, or to a reference library of certified emissions results for released recipes. Linking the accumulative or real time metrics reports to released best known methods (BKM's) and recipes or real time emissions sensors and feedback signals from equipment represents a significant improvement in accuracy and credibility. This invention automatically adjusts emission reports to account for uptime and various levels of operational mode (High, low, and Idle). Reports can be as simple as a total accumulation over time or instantaneous. Reports can be as simple as accumulative or instantaneous $CO_2$ equivalent meter or detailed and time logged data files or spreadsheets.

Figure 3A:
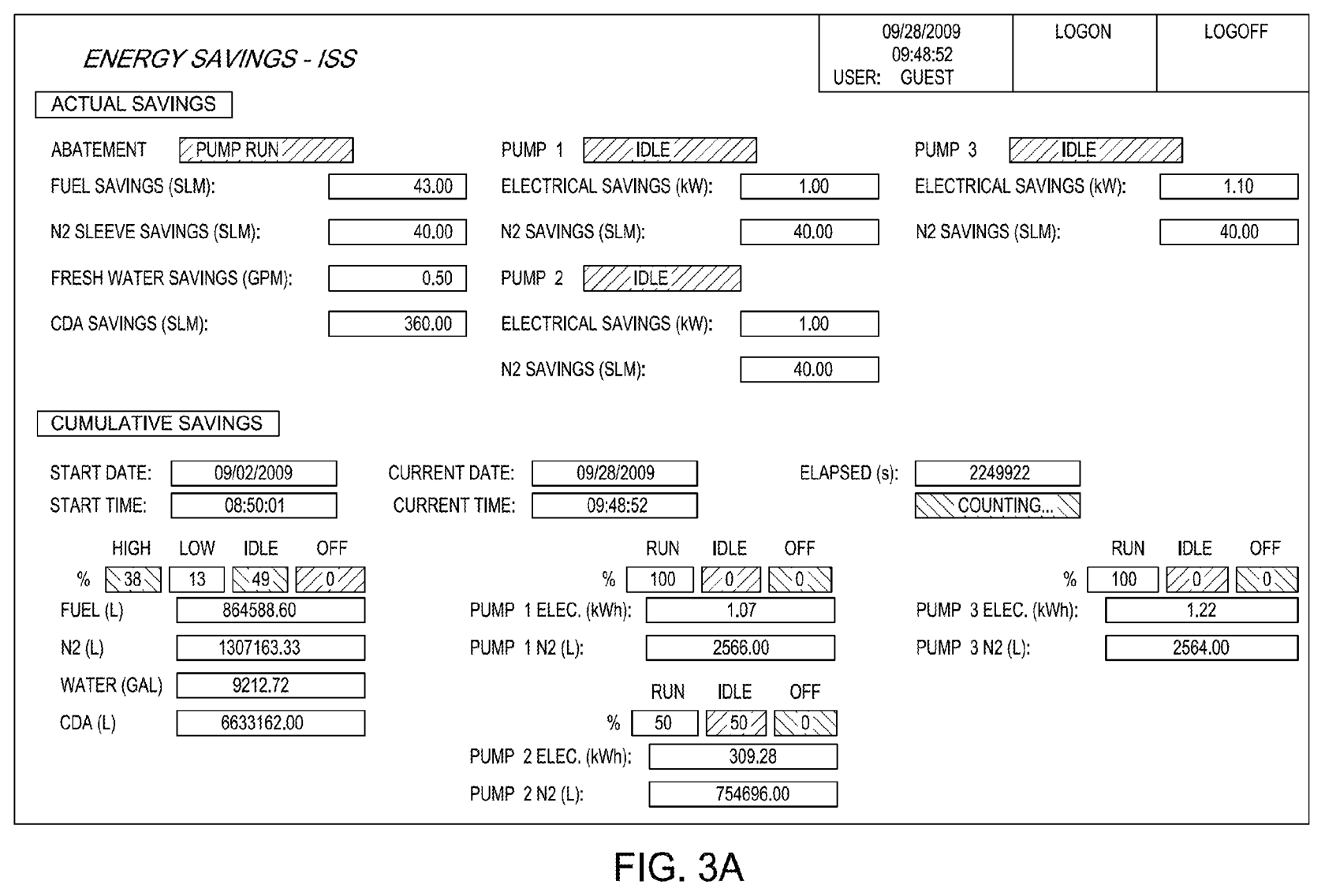
Figure 3B:
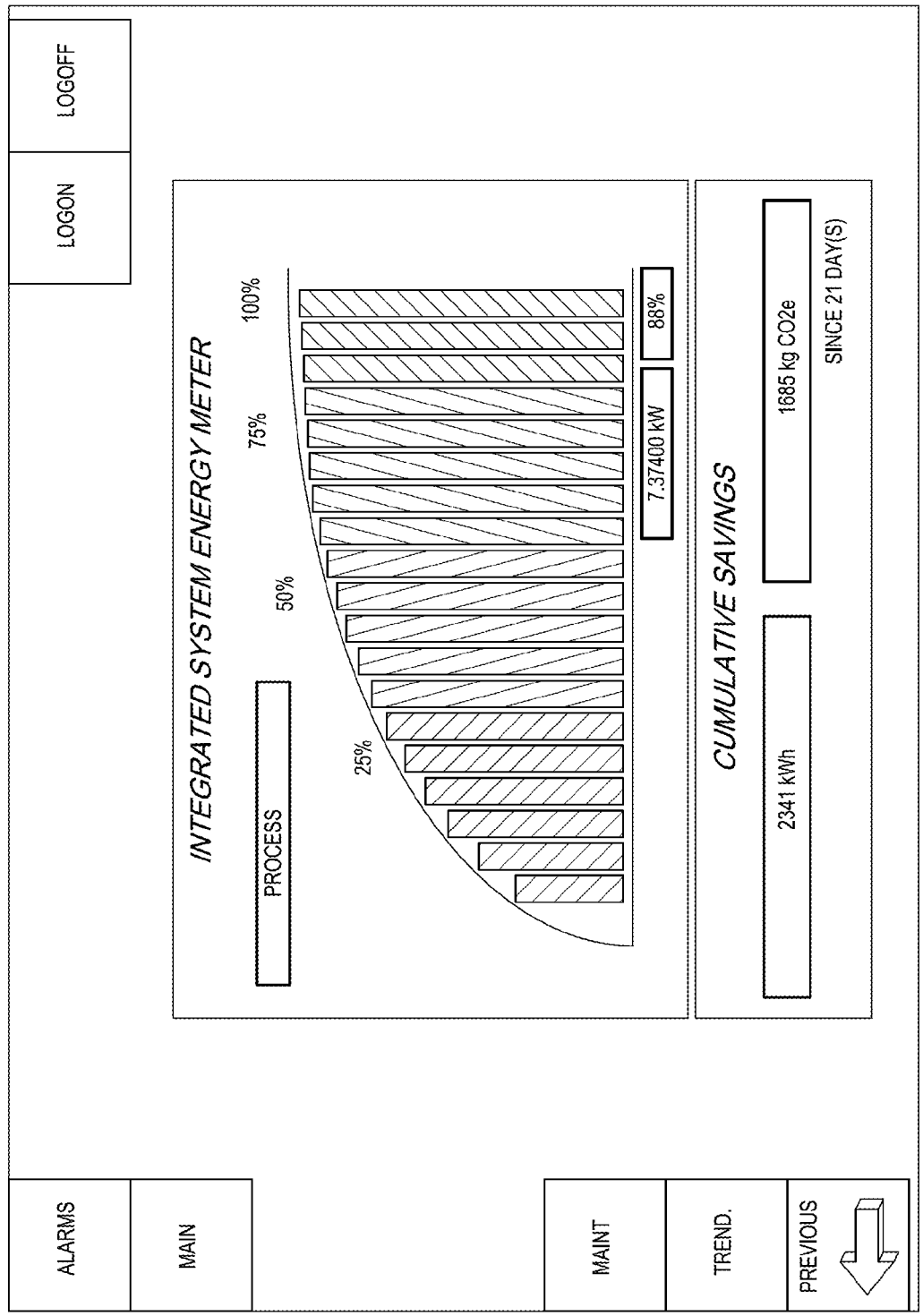
Figure 3C:
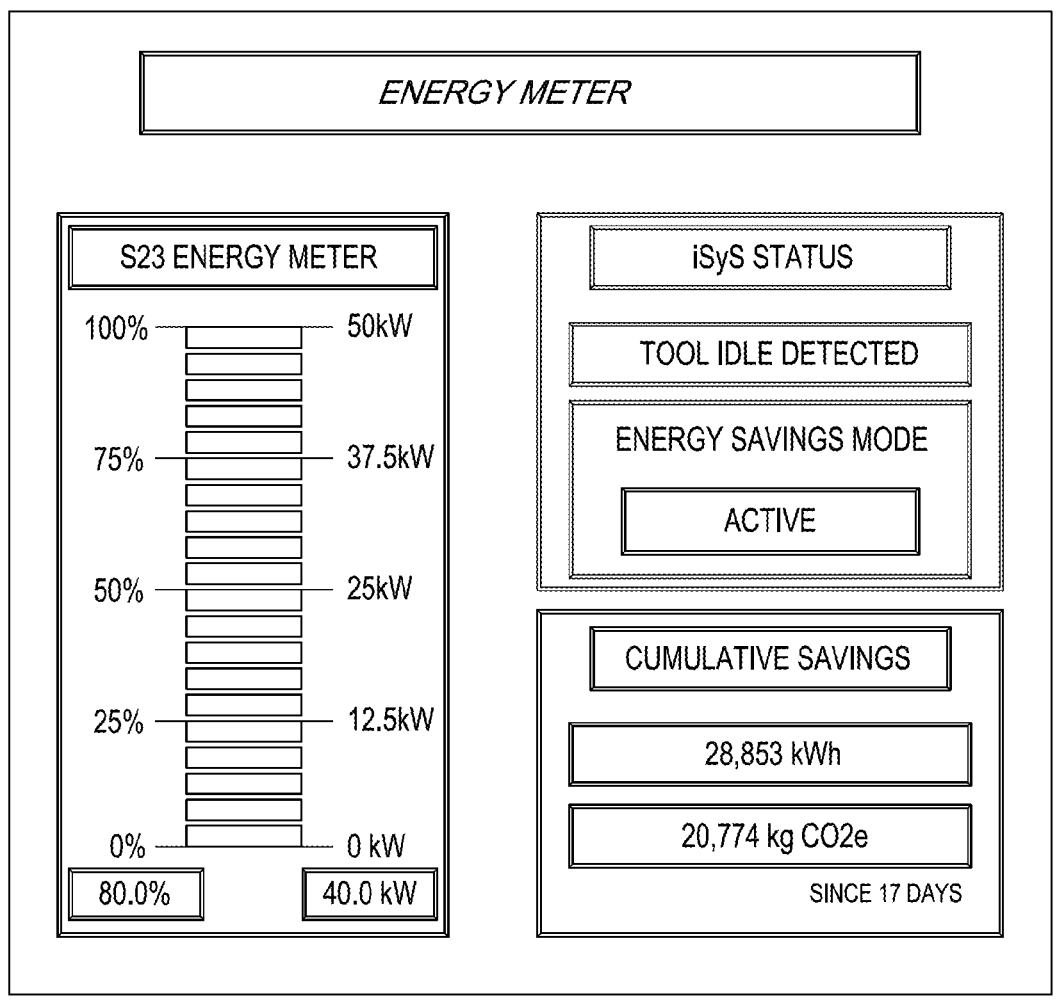

FIGS. 3A-C depict exemplary energy savings meters of an integrated sub-fab system in accordance with some embodiments of the present invention that can display the energy savings resultant from operation of the integrated sub-fab system.

Figure 4:
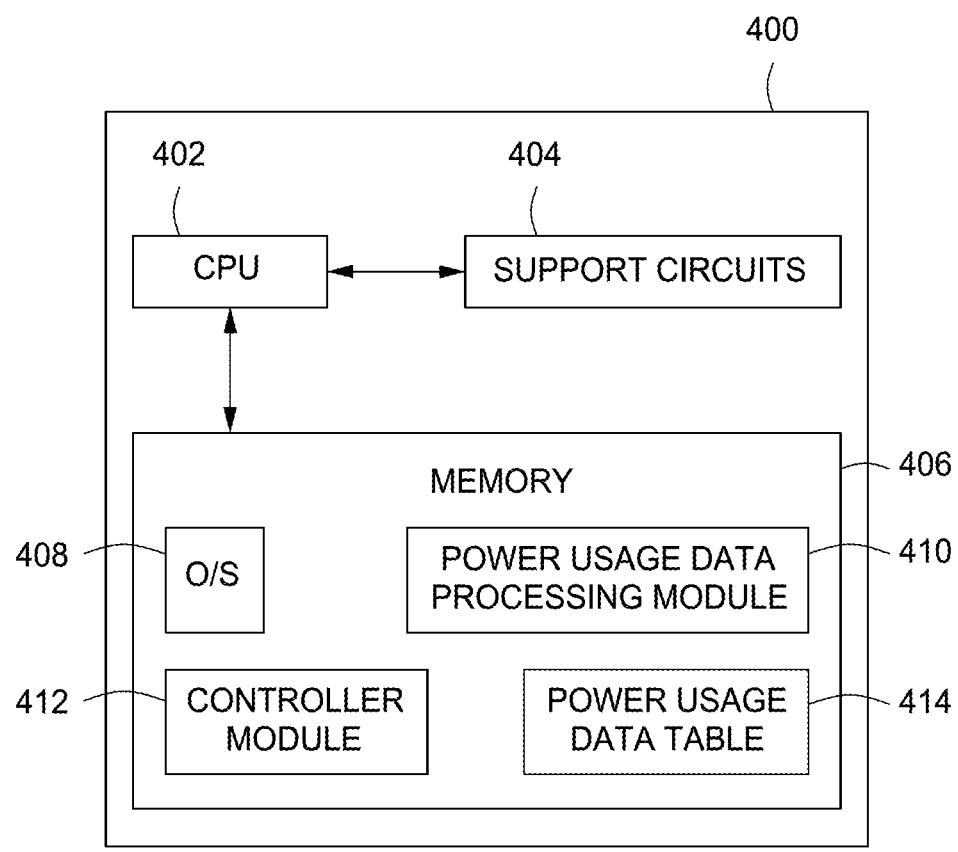
FIG. 4 is a block depiction of a controller for operating an electronic device manufacturing system sub-fab in accordance with some embodiments of the present invention.

FIG. 4 depicts an exemplary controller 400 for increasing the efficiency of electronic device manufacturing systems in accordance with some embodiment of the present invention. In some embodiments, the controller 400 is implemented as a computer operable to perform data collection, processing, and reporting for energy usage of one or more sub-fabs. The controller 400 comprises a central processing unit (CPU) 402, a plurality of support circuits 404, and a memory 406. While the present exemplary embodiment of a controller 400 is discussed with respect to a computer having a CPU, support circuits, and a memory, one of ordinary skill in the art would recognize that the controller 400 could be implemented in a variety of ways, including as an application specific interface circuit (ASIC), a field-programmable gate array (FPGA), a system-on-a-chip (SOC), and the like. Various embodiments of the controller 400 may also be integrated within the process tool controller 102 or the sub-fab front-end controller 108, with corresponding input/output interfaces as known in the art.

The support circuits 404 may include a display device as well as other circuits to support the functionality of the CPU 402. Such circuits may include clock circuits, cache, power supplies, network cards, video circuits and the like.

The memory 406 may comprise read only memory, random access memory, removable memory, disk drives, optical drives and/or other forms of digital storage. The memory 406 is configured to store an operating system 408, a power usage data processing module 410, a controller module 412, and an emissions data table 414. The operating system 408 executes to control the general operation of the controller 400, including facilitating the execution of various processes, applications, and modules to control the one or more manufacturing system sub-fabs. The controller module 412 operates to facilitate the control and operation of the one or more manufacturing system sub-fabs. While the present exemplary embodiment of the invention is shown with respect to a controller 400 for controlling one or more manufacturing system sub-fabs, one of ordinary skill in the art would recognize that the power management and data calculation operations discussed herein could be performed by a system coupled to the manufacturing system sub-fabs for data gathering purposes, but separate and distinct from the controller 400.

The power usage and data processing module 410 operates to receive data from the one or more manufacturing system sub-fabs, and to calculate the power usage of the one or more manufacturing system sub-fabs. In some embodiments, the received data comprises sensor information from the various sub-fabs. In some embodiments, the received data comprises information from the controller module 412 describing the current operating state of the one or more manufacturing system sub-fabs. The power usage data processing module 410 calculates the power usage of the one or more manufacturing system sub-fabs by comparing the current power usage of the manufacturing system sub-fabs with a peak power consumption of the manufacturing system sub-fabs. Power usage statistics may be calculated for a specific instant of time, over a particular time frame, or as a cumulative value for the process tool. In some embodiments, the power usage statistics are computed according to predetermined destruction removal efficiencies for each process chemical, and reports the cumulative emission statistics for that chemical after completion of the abatement process. A chemical consumption statistical report and post abetment emission statistical report may be generated at an individual process tool or cumulative by production line or across a factory. In some embodiments, the predetermined destruction removal efficiencies are calculated according to a predetermined emissions measurement standard, such as Semi S23 and/or Semi/EPA emissions reporting standards. In some embodiments, the power usage statistics are computed by comparing a current power consumption against a power usage data table 414. The power usage data table 414 may contain data describing the power usage of the manufacturing system sub-fabs at peak operating conditions. In some embodiments, the power usage data table 414 is dynamically generated based upon the configuration of the process tool 104 and associated manufacturing system sub-fabs. The method by which the power usage data processing module 414 computes the power usage statistics is described further with respect to FIG. 5.

Figure 5:
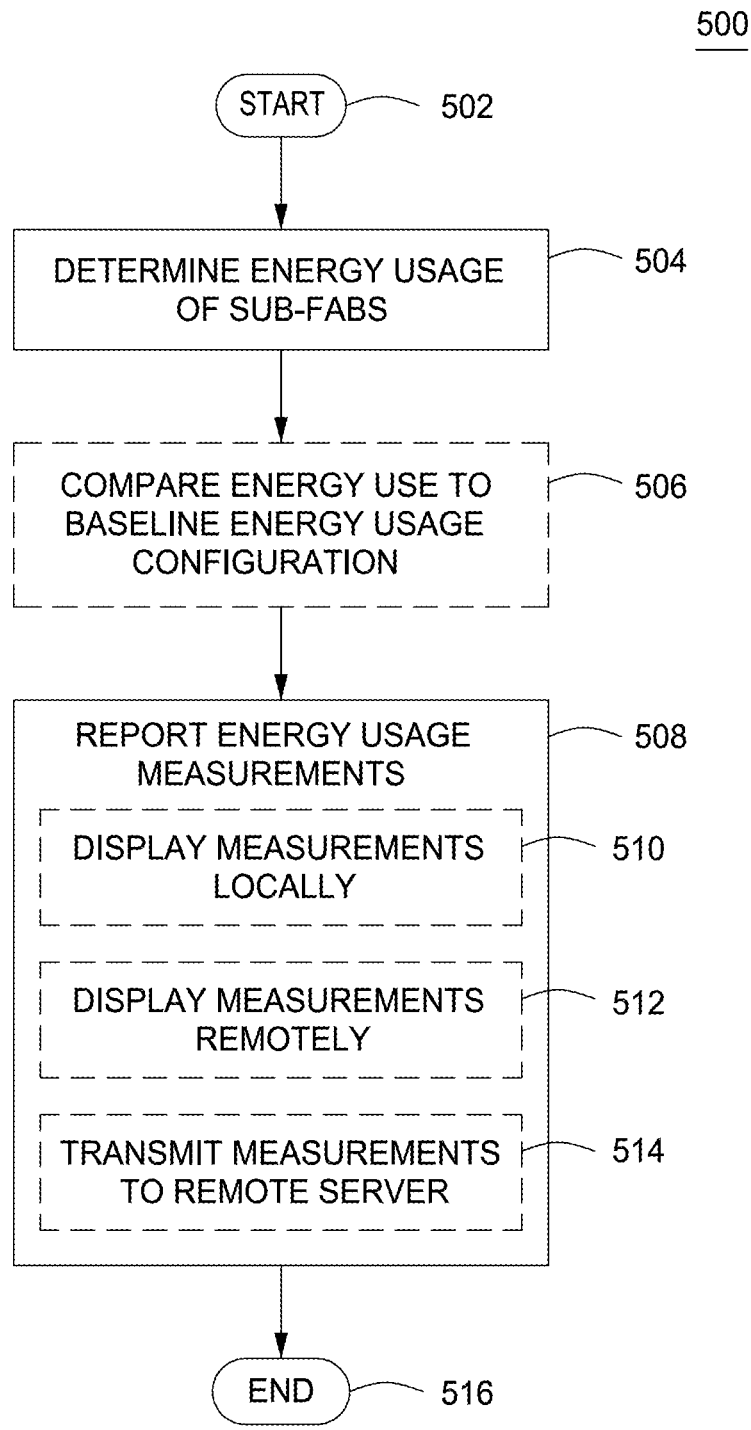
FIG. 5 is a flow diagram depicting a method for operating an electronic device manufacturing system sub-fab in accordance with some embodiments of the present invention.

FIG. 5 is a flow diagram depicting a method 500 for operating an electronic device manufacturing system sub-fab in accordance with some embodiments of the present invention. The method 500 begins at step 502 and proceeds to step 504. At step 504, the method 500 determines a set of energy usage measurements for one or more manufacturing system sub-fabs. As described above, the energy usage may be determined using sensor data received from the manufacturing sub-fabs, controller data received from a process tool controller 102 or sub-fab controller 108, or from a power usage data table 414 based upon information describing the current operating state of the process tool 104 and corresponding manufacturing system sub-fabs. After determining the current energy usage of the manufacturing system sub-fabs, the method 500 proceeds to optional step 506, or, in some embodiments, directly to step 508.

At optional step 506, the method 500 determines a difference between the determined energy use as determined at step 504, and a baseline energy usage configuration. The baseline energy usage configuration describes the energy usage of a process tool and associated sub-fabs that does not have the benefit of a low power energy usage configuration. The determined comparison is used to represent a total energy savings provided by the ability of the controller to operate the process tool 104 and/or one or more sub-fabs in a low power configuration. After determining the difference between the determined energy usage and the baseline energy usage configuration, the method 500 proceeds to step 508. In some embodiments, the delta in energy usage can also be measured with external devices and entered manually into the system.

At step 508, the method 500 reports the energy usage measurements. The reporting operation may be optionally performed in one or more different manners as described with respect to elements 510, 512, and 514. At element 510, the method 500 displays the energy usage measurements locally on the process tool controller. In some embodiments, the method 500 may utilize a display screen coupled to the controller itself. In some embodiments, the method 500 may display the data via an external display tool coupled to the controller for the specific purpose of displaying machine diagnostic data.

At element 512, the method 500 may display the measurements remotely, such as via a remote display specifically used for data aggregation and reporting. In some embodiments, the factory controller 128 functions as a remote display for this purpose. The remote server may aggregate data and generate reports by individual manufacturing system sub-fab, process tool, factory line, factory site, and the like. One of ordinary skill in the art would recognize that such energy usage data could be organized and presented in a variety of different ways, such as for a specific instant of time, over a period of time, and as an aggregate for the lifetime of a process tool or facility.

At element 514, the method 500 may transmit the energy usage measurements to a remote server. For example, the measurements may be transmitted to a company headquarters for analysis, or to a government agency to ensure compliance with emissions control standards. After reporting the energy usage measurements, the method 500 ends at step 516.

While the foregoing is directed to embodiments of the present invention, other and further embodiments of the invention may be devised without departing from the basic scope thereof.

What is claimed is:

1. An apparatus for providing energy usage measurements for an electronic device manufacturing system comprising:
   a controller that:
      determines a set of energy usage measurements for one or more manufacturing system sub-fabs of the electronic device manufacturing system;
      calculates an energy savings by determining a difference between the set of energy usage measurements with a baseline set of energy usage measurements;
      reports the set of energy usage measurements and calculated energy savings: and
      reports at least one of carbon foot print calculated based on total effluent gases and Destruction or Removal Efficiency (DRE), time mapped carbon footprint based on recipe step, carbon footprint report based on real time emissions measured of effluent from each step in a process recipe, or carbon footprint report based on qualified emissions measurement and calculated for effluent from each step in a process recipe as previously measured.

2. The apparatus of claim 1, wherein the energy usage measurements represent an energy consumption of the one or more manufacturing system sub-fabs in a low power configuration.

3. The apparatus of claim 1, wherein the controller is a sub-fab front end controller.

4. The apparatus of claim 1, wherein the energy usage measurements are reported for at least one of an instantaneous time, a time frame, or a lifetime of the one or more manufacturing system sub-fabs.

5. The apparatus of claim 1, further comprising a display for displaying the set of energy usage measurements.

6. The apparatus of claim 1, wherein the controller is further configured to report the set of energy usage measurements to a remote server.

7. The apparatus of claim 6, wherein the remote server provides for emissions tracking and reporting in accordance with a predetermined emissions measurement standard.

8. A system for providing energy usage measurements for an electronic device manufacturing system, comprising
one or more controllers that:
   determine a set of energy usage measurements for a plurality of manufacturing system sub-fabs of the electronic device manufacturing system;
   calculate an energy savings by determining a difference between the set of energy usage measurements with a baseline set of energy usage measurements;
   report the set of energy usage measurements and calculated energy savings to a remote server; and
   report at least one of carbon foot print calculated based on total effluent gases and Destruction or Removal Efficiency (DRE), time mapped carbon footprint based on recipe step, carbon footprint report based on real time emissions measured of effluent from each step in a process recipe, or carbon footprint report based on qualified emissions measurement and calculated for effluent from each step in a process recipe as previously measured; and
   wherein the remote server aggregates the energy usage measurements from the one or more controllers and provides an aggregated energy usage report.

9. A method for providing energy usage measurements for an electronic device manufacturing system, the method comprising:
   determining a set of energy usage measurements for one or more manufacturing system sub-fabs of the electronic device manufacturing system coupled to a controller;
   calculating an energy savings by determining a difference between the set of energy usage measurements with a baseline set of energy usage measurements;
   reporting the energy usage measurements and calculated energy savings, and
   reporting at least one of carbon foot print calculated based on total effluent gases and Destruction or Removal Efficiency (DRE), time mapped carbon footprint based on recipe step, carbon footprint report based on real time emissions measured of effluent from each step in a process recipe, or carbon footprint report based on qualified emissions measurement and calculated for effluent from each step in a process recipe as previously measured.

10. The method of claim 9, wherein the energy usage measurements represent an energy consumption of the one or more manufacturing system sub-fabs in a low power configuration.

11. The method of claim 9, wherein the energy usage measurements are reported for at least one of an instantaneous time, a time frame, or a lifetime of the manufacturing tool.

12. The method of claim 9, further comprising displaying the set of energy usage measurements.

13. The method of claim 9, wherein the report the set of energy usage measurements is reported to a remote server.

14. The method of claim 9, wherein the reporting step further comprises reporting the set of energy usage measurements in a format consistent with a predetermined emissions measurement standard.

15. The apparatus of claim 1, wherein the controller is further configured to monitor and display all gas emissions from the electronic device manufacturing system.

16. The method of claim 9, further comprising:
monitoring and displaying all gas emissions from the electronic device manufacturing system.

* * * * *